United States Patent Office 3,337,631
Patented Aug. 22, 1967

3,337,631
PROCESS OF PREPARING N,O-DIMETHYL-HYDROXYLAMINE
Henry J. Gerjovich, Wilmington, and Donald L. Smathers, Claymont, Del., assignors to E. I. du Pont de Nemours and Company, Wilmington, Del., a corporation of Delaware
No Drawing. Original application Mar. 7, 1961, Ser. No. 93,849, now Patent No. 3,178,467, dated Apr. 13, 1965. Divided and this application June 12, 1964, Ser. No. 374,805
2 Claims. (Cl. 260—583)

This application is a divisional application of my copending application Ser. No. 93,849 filed Mar. 7, 1961, now Patent No. 3,178,467.

This invention relates to the preparation of N,O-dimethylhydroxylamine and homologues and is more particularly directed to processes for making such amines beginning with an alpha substituted N-methyl nitrone. The invention is further directed to N-alpha-substituted-alkylidene-N-$R_2$-oxy-N-methylammonium salts.

Processes of the invention can be illustrated generally in the following diagram:

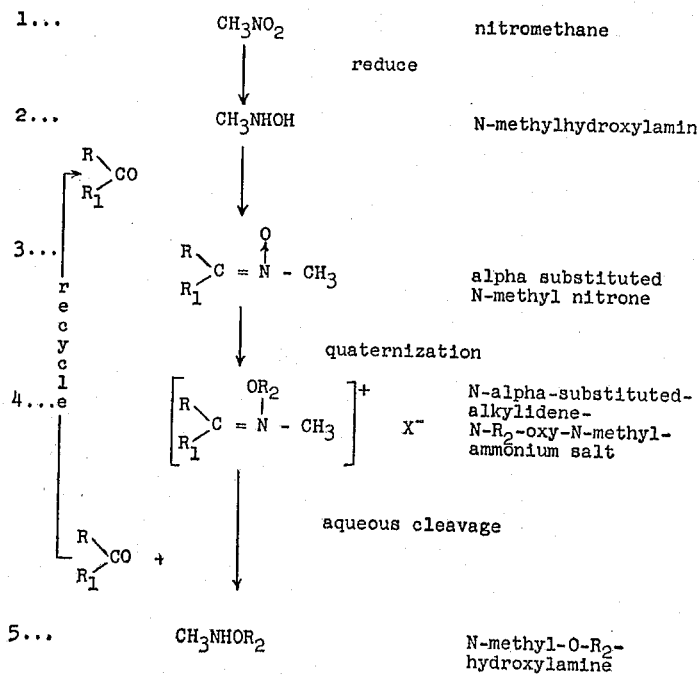

where $R$ = hydrogen or an alkyl group of 1 through 4 carbon atoms,
$R_1$ = hydrogen, an alkyl group of 1 through 4 carbon atoms, phenyl, tolyl, monochloro or dichlorophenyl, nitro phenyl or furyl groups, or R and $R_1$ taken together = cyclohexyl or cyclopentyl rings,
$R_2$ = alkyl or alkenyl groups of 1 through 4 carbon atoms,
$X$ = alkyl sulfates of 1 to 4 carbon atoms, benzenesulfonate, toluenesulfonate, chloride, iodide, or bromide.

Production of the nitrone

The nitrone employed as a starting material can be prepared in any convenient way. As illustrated above nitromethane can be reduced as by catalytic hydrogenation with a palladium on carbon catalyst and hydrogen gas under 20 to 60 pounds per square inch gauge of pressure. An acid such as oxalic should be present to take up the N-methylhydroxylamine which forms as a product.

The N-methyl-hydroxylamine is freed from the acid by the addition of a suitable base such as sodium hydroxide and is then reacted with the substituted carbonyl compound as shown above. The hydroxylamine is of course in aqueous solution as a result of the hydrogenation and the substituted aldehyde or ketone is simply stirred into it to produce the corresponding nitrone.

The aldehyde or ketone is determined by the R and $R_1$ substituents to be present in the novel N-alpha-substituted-alkylidene-N-$R_2$-oxy-N-methylammonium salts of the invention. The aldehyde or ketone is regenerated in the process and is recycled. Additional aldehyde or ketone can be added as required to make up losses.

The particular ketone or aldehyde employed is unimportant in the processes of the invention. As will be seen from the flow diagram above the aqueous cleavage separates out the ketone or aldehyde, whatever its character, and it does not enter into the final product produced. It is therefore quite unimportant in terms of the production of N-methyl-O-$R_2$ hydroxylamine what ketone or aldehyde is employed.

Ketones and aldehydes which can be used, as indicated above, include the following:

(1) formaldehyde
(2) acetaldehyde
(3) propionaldehyde
(4) butyraldehyde
(5) valeraldehyde
(6) benzaldehyde
(7) ortho, meta, para-tolualdehyde
(8) ortho, meta, para-chlorobenzaldehyde
(9) dichlorobenzaldehyde
(10) furfuraldehyde
(11) ortho, meta, para, nitrobenzaldehyde

(12) acetone
(13) methyl ethyl ketone
(14) diethyl ketone
(15) acetophenone
(16) propiophenone
(17) cyclopentanone
(18) cyclohexanone The nitrone as produced can conveniently be isolated by extraction into a water immiscible solvent for it such as chloroform, methylene chloride, trichloroethylene, tetrachloroethylene, toluene, or trichloroethane.

The product as thus prepared can be dried from the solvent or, as will become apparent below, further reaction can be conducted in the solvent.

*Preparation of N-alpha-substituted-alkylidene-N-$R_2$-oxy-N-methylammonium salt*

According to the invention a nitrone of the type above described resulting from the particular ketone or aldehyde employed is quaternized by treatment under anhydrous conditions and at a temperature from 35 to 110° C.

The quaternizing agents employed are those which have the structure $R_2X$ where X has the value above described. Thus there can be used methylating agents such as dimethylsulfate, methylchloride, methyl iodide, methyl bromide, methyl benzenesulfonate, methyl paratoluenesulfonate.

Other quaternizing agents which can be employed include diethyl sulfate, dipropyl sulfate, dibutyl sulfate, allyl chloride, allyl bromide, methallyl chloride, allyl benzenesulfonate, allyl toluenesulfonate, butyl benzenesulfonate, 2-butenyl benzenesulfonate, propyl toluenesulfonate.

The amount of the quaternizing agent will ordinarily be a molecularly equivalent to the nitrone. There is no advantage to using an excess but no great disadvantage. It is enough that approximately one mol be used.

Quaternization is conducted in a substantially anhydrous condition since any water present usually results in a loss of yield. The reaction can be conducted between the nitrone and the quaternizing agent in a melted condition or the reaction can be conducted in a mutual solvent.

The solvents can be any of those mentioned earlier for the nitrone and additionally there can be used:

| | |
|---|---|
| benzene | dibutylether |
| carbon tetrachloride | dichlorobenzene |
| xylene | dioxane. |
| chlorobenzene | |

The amount of solvent is almost immaterial. Enough should be used to give a fluid system but no great excess should be used because of expense, both of solvent and handling equipment.

The quaternization can be conducted over a considerable range of temperatures from room temperature or slightly above up to the decomposition point of one of the components or the end product. Generally if the contents are to be molten, higher temperatures will be used up to 150 to even 200° C. and of course a quaternizing agent such as methyl chloride or another volatile material would not remain in the system unless it were contained under pressure.

It is preferred to employ somewhat lower temperatures ranging from about 35 to 110° C. and ordinarily a temperature as low as will give a reasonable rate of reaction is preferred.

It will be understood that the N-alpha-substituted-alkylidene-N-$R_2$-oxy-N-methylammonium salts will be those having the R, $R_1$, and $R_2$ substituents as above described in connection with the quaternizing agent and the aldehydes and ketones. Examples of such salts are given below:

(1) N-benzylidene-N-ethoxy-N-methylammonium ethosulfate
(2) N-methyl - N-(p-methylbenzylidene) - N-n-propoxyammonium proposulfate
(3) N-n-butoxy-N-(o-chlorobenzylidene)-N-methylammonium butosulfate
(4) N-(p-chloro-α-methylbenzylidene)-N-methyl-N-vinyloxyammonium p-toluenesulfonate
(5) N-(2-furfurylidene)-N-methoxy-N-methylammonium chloride
(6) N-allyloxy-N-(2,4-dichloro-α-ethylbenzylidene)-N-methylammonium bromide
(7) N-(2-butenoxy)-N-(m-chloro-α-propylbenzylidene)-N-methylammonium chloride
(8) N-(3,4-dichlorobenzylidene)-N-methyl-N-propenoxyammonium benzenesulfonate
(9) N-methoxy-N-methyl-N-(m-nitrobenzylidene) ammonium iodide
(10) N-methyl-N-(o-methylbenzylidene)-N-iso-propenoxyammonium o-toluenesulfonate
(11) N-methyl-N-(p-nitrobenzylidene)-N-iso-propoxyammonium iodide
(12) N-sec-butoxy-N-methyl-N-(m-methylbenzylidene) ammonium bromide
(13) N-iso-butoxy-N-methyl-N-(α-methylbenzylidene) ammonium chloride
(14) N-butylidene-N-methoxy-N-methylammonium methosulfate
(15) N-iso-propylidene-N-methoxy-N-methylammonium iodide
(16) N-(2-butylidene)-N-ethoxy-N-methylammonium bromide
(17) N-(3-hexylidene)-N-methyl-N-n-propoxyammonium p-toluenesulfonate
(18) Bis-(N-2-hexylidene-N-methoxy-N-methylammonium) sulfate
(19) N-cyclohexylidene-N-methoxy-N-methylammonium methosulfate
(20) N-cyclopentylidene-N-methoxy-N-methylammonium iodide

*The aqueous cleavage*

It is remarkable that the N-alpha-substituted-alkylidene-N-$R_2$-oxy-N-methylammonium salts of the invention are readily split up by the simple addition of one or more molecular equivalents of water to produce N-methyl-O-$R_2$-hydroxylamines with concurrent regeneration of the carbonyl compound corresponding to the starting nitrone. These two can be separated in any convenient manner, examples of which will be given hereinafter. Thus they can be separated by extraction.

Sulfuric acid, hydrochloric acid, or another mineral acid can, if desired, be added to the water. It is thought that the acid keeps the amine in aqueous solution. The amount of acid can vary from 0.01 to 2 mols based upon the weight of amine.

The N-methyl-O-$R_2$-hydroxylamine compounds and more particularly N,O-dimethylhydroxylamine can be converted to a desired urea by reaction with an appropriate isocyanate. Thus if a 3,4-dichlorophenylisocyanate is used with N,O-dimethylhydroxylamine one obtains 1-(3,4-dichlorophenyl)-3-methyl-3-methoxyurea. Other $R_2$-oxy ureas and especially the methoxyureas of U.S. Patent 2,960,534 issued Nov. 15, 1960 to Otto Scherer and Paul Heller can similarly be prepared using the appropriate isocyanate.

In order that the invention may be better understood reference should be had to the following illustrative examples:

EXAMPLE 1

According to a preferred practice of the invention, N-benzylidene - N-methoxy - N-methylammonium - methosulfate is prepared and from it by aqueous cleavage there is prepared N,O-dimethylhydroxylamine according to the following scheme:

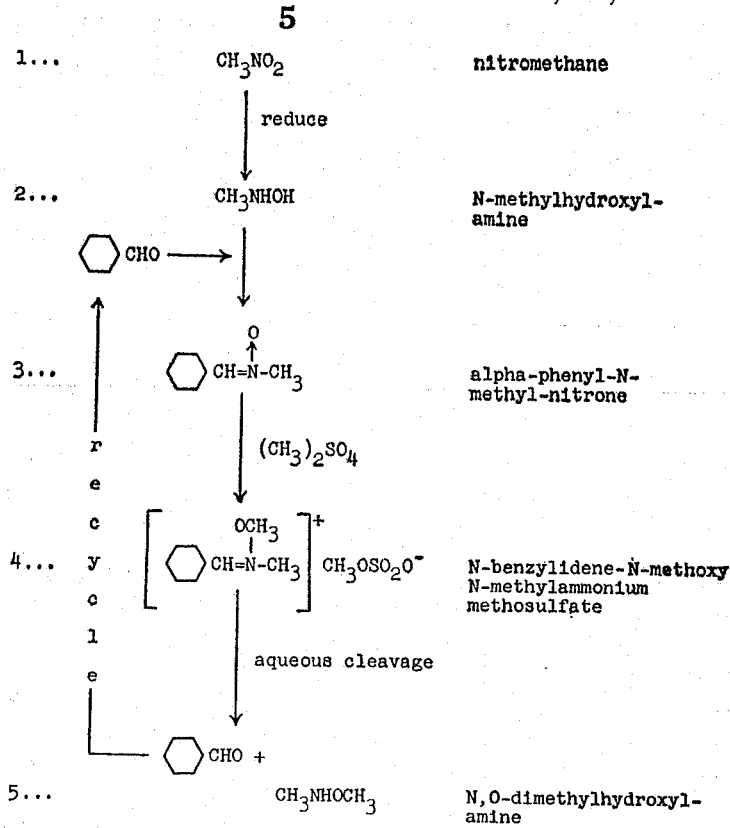

Sixty-one parts by weight of nitromethane and 63 parts by weight of oxalic acid dihydrate and 6 parts by weight of 5% palladium on activated carbon catalyst and 1000 parts by weight of water are charged into a pressure vessel. The vessel is sealed and hydrogen is introduced to a pressure of 60 pounds per square inch gauge. As the vessel is shaken there is a slight temperature rise. The hydrogenation is continued until about 4 parts by weight of hydrogen are absorbed.

The vessel is vented and the vessel's contents are filtered to remove the catalyst and transferred to a vessel equipped with a stirrer.

Forty parts by weight of sodium hydroxide as a 50% aqueous solution is added and stirred into the product. It is preferred not to permit the temperature to rise in the stirred vessel to a high figure and should be kept below, say, 30° C. though this is not critical. Particularly if solid sodium hydroxide is used there is a considerable tendency for the temperature to rise.

Eighty-five parts by weight of benzaldehyde is added and the mixture is stirred for about ten minutes. At this time the reaction is essentially complete.

The reaction mixture is successively extracted with 4 aliquots of chloroform each of which is about one-fourth the volume of the solution being treated. The combined chloroform extracts are dried over sodium sulfate and evaporated to dryness. The product thus produced is the nitrone shown above in Formula 3.

*Quaternization of the nitrone*

250 parts by weight of toluene and 101 parts by weight of dimethylsulfate are added to 108 parts by weight of the nitrone prepared as above. The slurry is warmed gradually and a clear solution is obtained as the temperature rises. The temperature is raised to about 75° C. It is to be noted that as the product forms the solution again becomes cloudy. Heating is continued until the solution begins to boil. Heating is then discontinued. The solution is then allowed to cool.

The resulting solution is chilled and the vessel is scratched or seeded to promote crystallization of the product. The product is then separated and can be stored if kept dry.

The yield based on the nitrone is substantially 100%, the only major loss being material retained on the equipment.

*The aqueous cleavage*

100 parts by weight of the product prepared as above is treated with an equal weight of water at 40° C. The water contains sulfuric acid in the amount of 15 parts $H_2SO_4$ by weight.

The solution as produced is extracted with twice its volume of toluene to remove the benzaldehyde. This can then be returned to the reaction. The remaining aqueous solution is adjusted to pH 6–7 and the amine is recovered by distillation.

EXAMPLE 2

One hundred thirty-five parts by weight of alpha-phenyl-N-methyl nitrone, 100 parts by weight of o-dichlorobenzene, and 60 parts by weight of methyl chloride are charged to a vessel equipped for pressure operation. The vessel is sealed, the temperature is raised to 175° C. and held for three hours. The vessel is cooled and vented. The product, if not already crystalline, is crystallized by cooling and scratching and then recovered by filtration. The N-benzylidene-N-methoxy-N-methylammonium chloride thus produced can be hydrolyzed in the manner described in Example 1 to produce N,O-dimethylhydroxylamine.

EXAMPLE 3

Eighty-seven parts by weight of alpha-alpha,N-trimethyl nitrone and 126 parts by weight of dimethylsulfate are mixed and held at 45–50° C. for one hour. The N-iso-propylidene - N-methoxy-N-methylammonium methosulfate thus produced is crystallized by cooling and scratching.

Two hundred thirteen parts by weight of the product is treated with an equal weight of water containing 5 parts $H_2SO_4$ by weight at 30° C. for one-half hour. The resulting clear solution is adjusted to pH 6–7 and N,O-dimethylhydroxylamine is distilled out first, followed by the acetone. The latter is then recycled.

EXAMPLES 4 THROUGH 23

In the following examples a nitrone with the designated R and $R_1$ substituents is prepared using an aldehyde or ketone with corresponding R and $R_1$ groups. A quaternizing agent $R_2X$ is employed as set out in the table below where the values of R, $R_1$, $R_2$, and X are tabulated. The N-alpha-substituted-alkylidene-N-$R_2$-oxy-N-methyl-ammonium salt is produced at the temperatures and times listed and having the appropriate R, $R_1$, $R_2$, and X values and then by aqueous cleavage there is produced an N-methyl,O-$R_2$-hydroxylamine.

R is selected from the group consisting of hydrogen and alkyl of 1 through 4 carbon atoms;

$R_1$ is selected from the group consisting of hydrogen, alkyl of 1 through 4 carbon atoms, phenyl, tolyl, monochlorophenyl, dichlorophenyl, nitrophenyl and furyl; and R and $R_1$ taken together are selected from the group consisting of cyclohexyl and cyclopentyl and adding water to effect aqueous cleavage thus producing N,O-dimethylhydroxylamine.

| Ex. No. | R | $R_1$ | $R_2$ | X | Quaternizing Conditions | N-Methyl-O-Substituted Hydroxylamine |
|---|---|---|---|---|---|---|
| 4 | Phenyl | Hydrogen | Ethyl | Ethosulfate | 80° C.; ½ hour; no solvent | N-methyl-O-ethylhydroxylamine |
| 5 | p-Tolyl | do | n-Propyl | Proposulfate | 100° C.; ¾ hour; dioxane solvent | N-methyl-O-n-propylhydroxylamine |
| 6 | o-Chlorophenyl | do | n-Butyl | Butosulfate | 110° C.; 1 hour; toluene solvent | N-methyl-O-n-butylhydroxylamine |
| 7 | p-Chlorophenyl | Methyl | Vinyl | p-Toluenesulfonate | 60° C.; 3 hours; chloroform solvent | N-methyl-O-vinylhydroxylamine |
| 8 | 2-furyl | Hydrogen | Methyl | Chloride | 140° C.; 3½ hours; xylene solvent | O-N-dimethylhydroxylamine |
| 9 | 2,4-dichlorophenyl | Ethyl | Allyl | Bromide | 30° C.; 10 hours; carbon tetrachloride solvent | N-methyl-O-allylhydroxylamine |
| 10 | m-Chlorophenyl | Propyl | 2-butenyl | Chloride | 60° C.; 2 hours; tetrachloroethylene solvent | N-methyl-O-(2-butenyl)hydroxylamine |
| 11 | 3,4-dichlorophenyl | Hydrogen | Propenyl | Benzenesulfonate | 40° C.; 8 hours; methylene chloride solvent | N-methyl-O-propenylhydroxylamine |
| 12 | m-Nitrophenyl | do | Methyl | Iodide | 84° C.; 5 hours; trichloroethylene solvent | O,N-dimethylhydroxylamine |
| 13 | o-Tolyl | do | Isopropenyl | o-Toluenesulfonate | 74° C.; 2 hours; trichloroethane solvent | N-methyl-O-isopropenylhydroxylamine |
| 14 | p-Nitrophenyl | do | iso-Propyl | Iodide | 135° C.; 4 hours; xylene solvent | N-methyl-O-iso-propylhydroxylamine |
| 15 | m-Tolyl | do | sec-Butyl | Bromide | 142° C.; 3 hours; dibutyl-ether solvent | N-methyl-O-sec-butylhydroxylamine |
| 16 | Phenyl | Methyl | iso-Butyl | Chloride | 135° C.; 5 hours; chlorobenzene solvent | N-methyl-O-iso-butylhydroxylamine |
| 17 | Hydrogen | Butyl | Methyl | Methosulfate | 40° C.; 2 hours; no solvent | O,N-dimethylhydroxylamine |
| 18 | Methyl | Methyl | do | Iodide | 80° C.; 5 hours; benzene solvent | Do. |
| 19 | Ethyl | do | Ethyl | Bromide | 38° C.; 8 hours; no solvent | N-methyl-O-ethylhydroxylamine |
| 20 | Propyl | Ethyl | n-Propyl | p-Toluenesulfonate | 60° C.; 3 hours; chloroform solvent | N-methyl-O-n-propylhydroxylamine |
| 21 | Butyl | Methyl | Methyl | Sulfate | 45° C.; 4 hours; no solvent | O,N-dimethylhydroxylamine |
| 22 | Pentamethylene | | do | Methosulfate | 60° C.; ½ hour; no solvent | Do. |
| 23 | Tetramethylene | | do | Iodide | 100° C.; 4 hours; dioxane solvent | Do. |

The invention claimed is:
1. In a process for making N,O-dimethylhydroxylamine the steps comprising methylating a nitrone

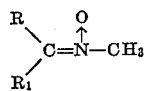

where

2. The process of claim 1 wherein R is hydrogen and $R_1$ is phenyl.

References Cited

UNITED STATES PATENTS 3,207,787  9/1965  Levy _____ 260—583 X

CHARLES B. PARKER, *Primary Examiner*.

R. L. RAYMOND, *Assistant Examiner*.